US011904349B2

(12) United States Patent
Jou et al.

(10) Patent No.: US 11,904,349 B2
(45) Date of Patent: Feb. 20, 2024

(54) SPRAY APPLICATION SYSTEM AND METHOD FOR APPLYING A SPRAY TREATMENT

(71) Applicant: The Boeing Company, Chicago, IL (US)

(72) Inventors: Yu-Chin Jou, Bellevue, WA (US); Brian R. Conlan, Seattle, WA (US); Thi Q. Nguyen, Everett, WA (US); Jeffrey T. Tan, Everett, WA (US); Ryan Walter Throckmorton, Seattle, WA (US); Eli Samuel Horden, Seattle, WA (US); Arturo Trejo, St. Louis, MO (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/054,902

(22) Filed: Nov. 12, 2022

(65) Prior Publication Data

US 2023/0075908 A1 Mar. 9, 2023

Related U.S. Application Data

(62) Division of application No. 16/902,043, filed on Jun. 15, 2020, now Pat. No. 11,511,314.

(51) Int. Cl.
*B05D 1/02* (2006.01)
*B05B 13/02* (2006.01)

(52) U.S. Cl.
CPC .............. *B05D 1/02* (2013.01); *B05B 13/02* (2013.01)

(58) Field of Classification Search
None
See application file for complete search history.

(56) References Cited

U.S. PATENT DOCUMENTS

| 5,595,451 | A | 1/1997 | Harrison, Jr. |
| 2010/0272915 | A1 | 10/2010 | Laws |
| 2019/0100332 | A1* | 4/2019 | Mindock ............... B05B 16/405 |

OTHER PUBLICATIONS

"Portable Spray Booth," Sentry Air Systems, Inc., Available Online at https://www.sentryair.com/portable-spray-booth.htm, Available as Early as Aug. 5, 2020, 3 pages.

* cited by examiner

*Primary Examiner* — Michael P. Rodriguez
(74) *Attorney, Agent, or Firm* — Alleman Hall & Tuttle LLP

(57) ABSTRACT

A spray application system and a method of its operation are provided for applying a spray treatment onto a surface of an airframe of an aircraft. The spray application system includes a set of multiple modular hood units that are combinable to form a combined enclosure that defines a shared interior volume. Each modular hood unit of the set includes one or more enclosure walls. At least two airframe-interfacing edges of each modular hood unit define a portion of a spray treatment region of the airframe. At least one inter-unit-interfacing edge of each modular hood unit is configured to interface with another inter-unit-interfacing edge of a neighboring modular hood unit of the set to form at least a portion of the combined enclosure. A spray access port is defined within an enclosure wall of each modular hood unit.

20 Claims, 9 Drawing Sheets

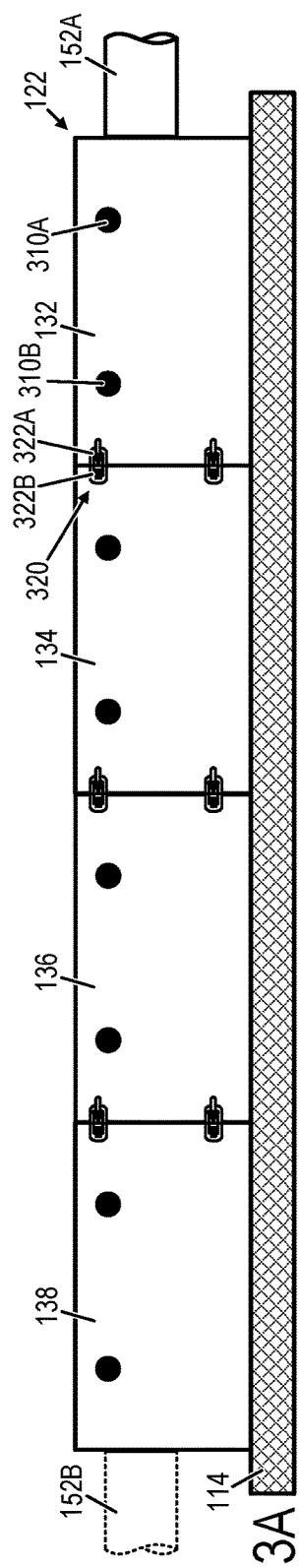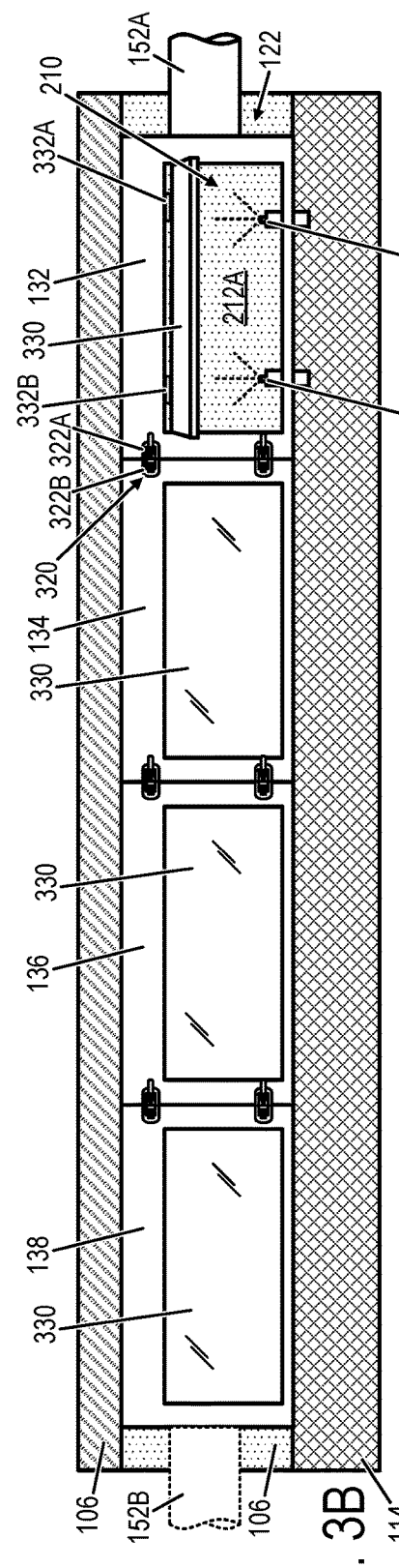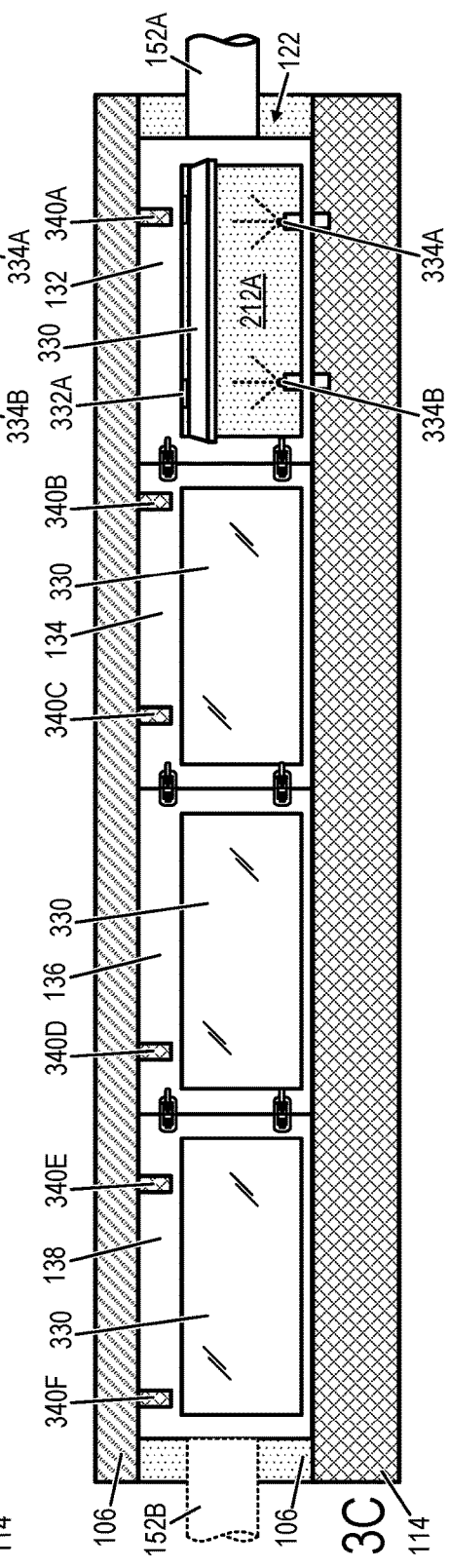

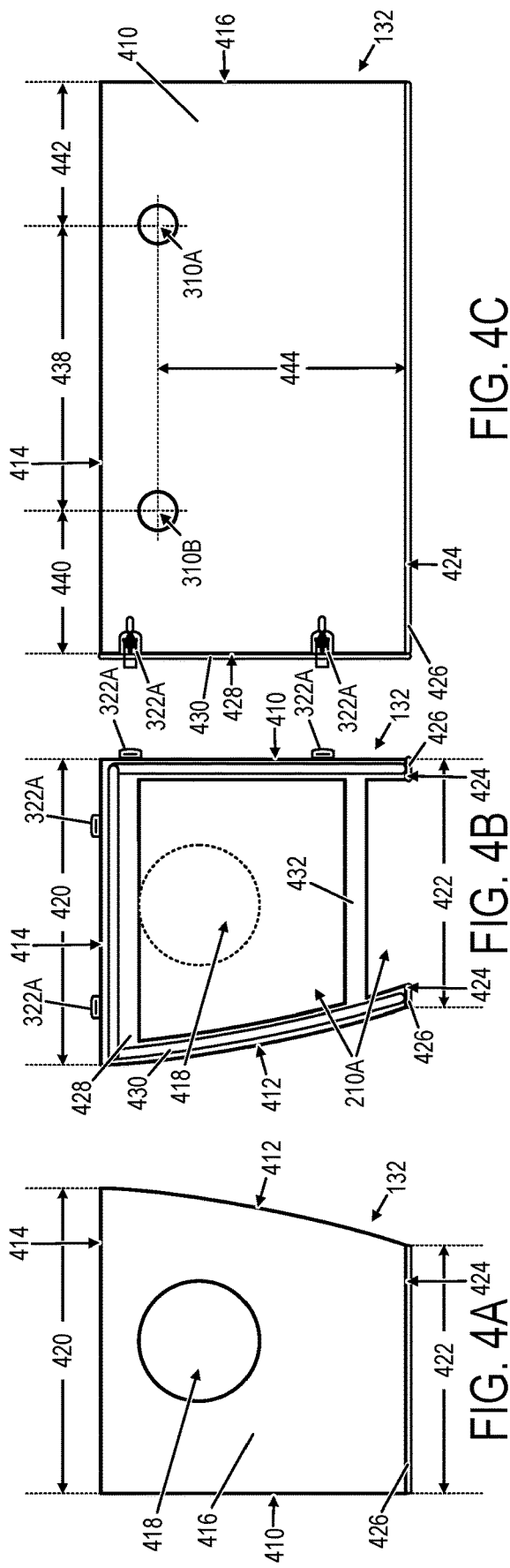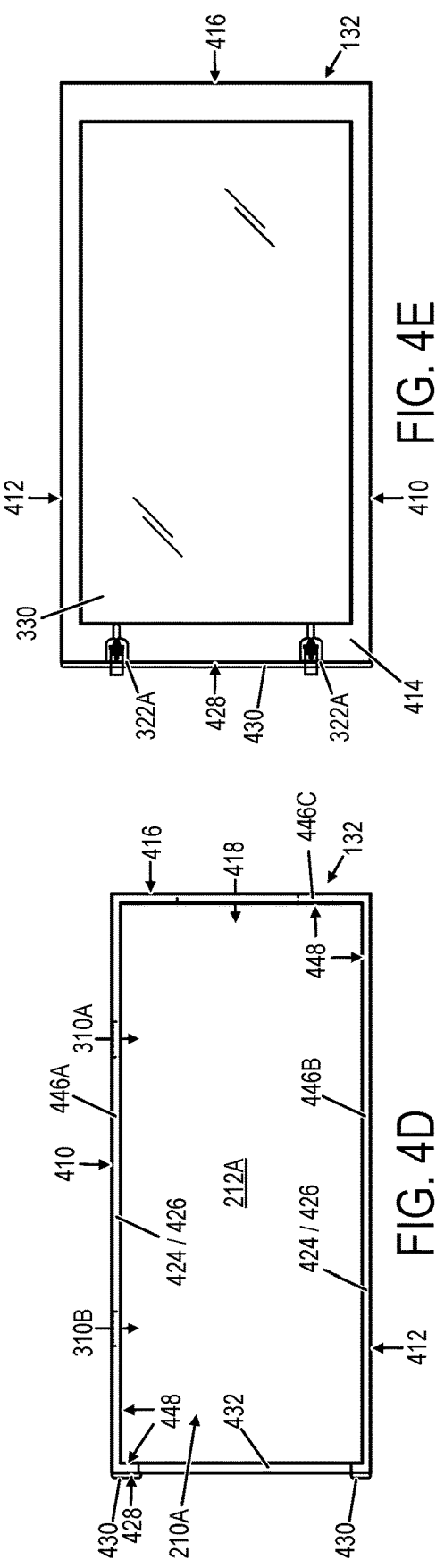

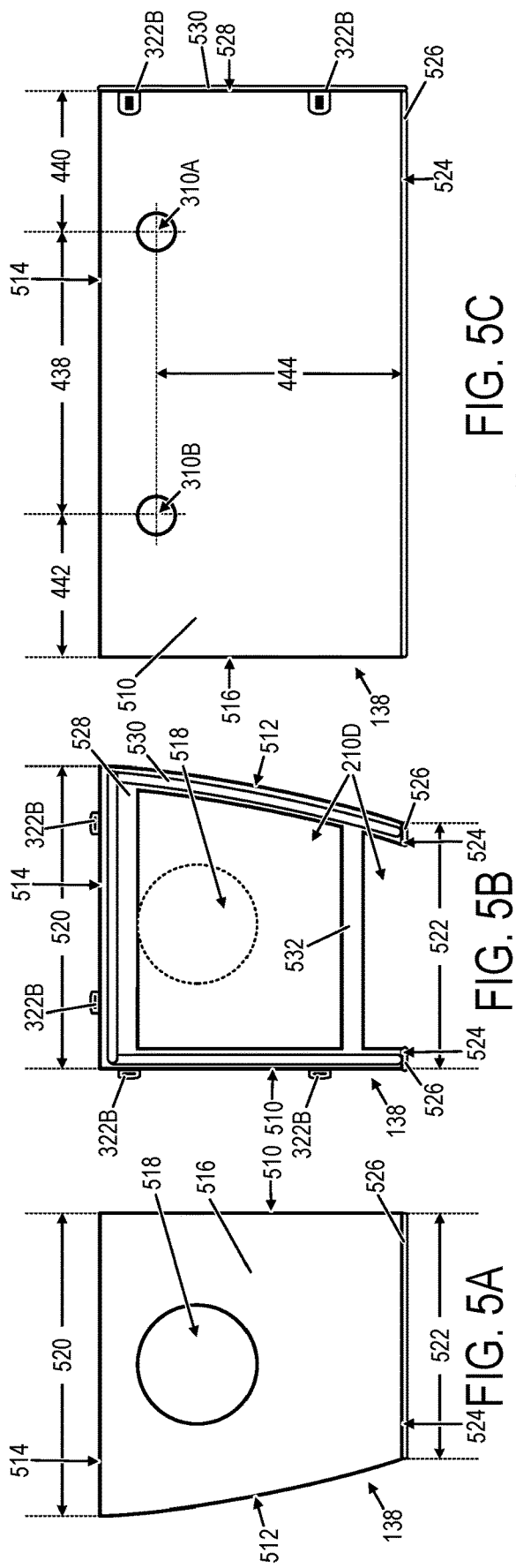
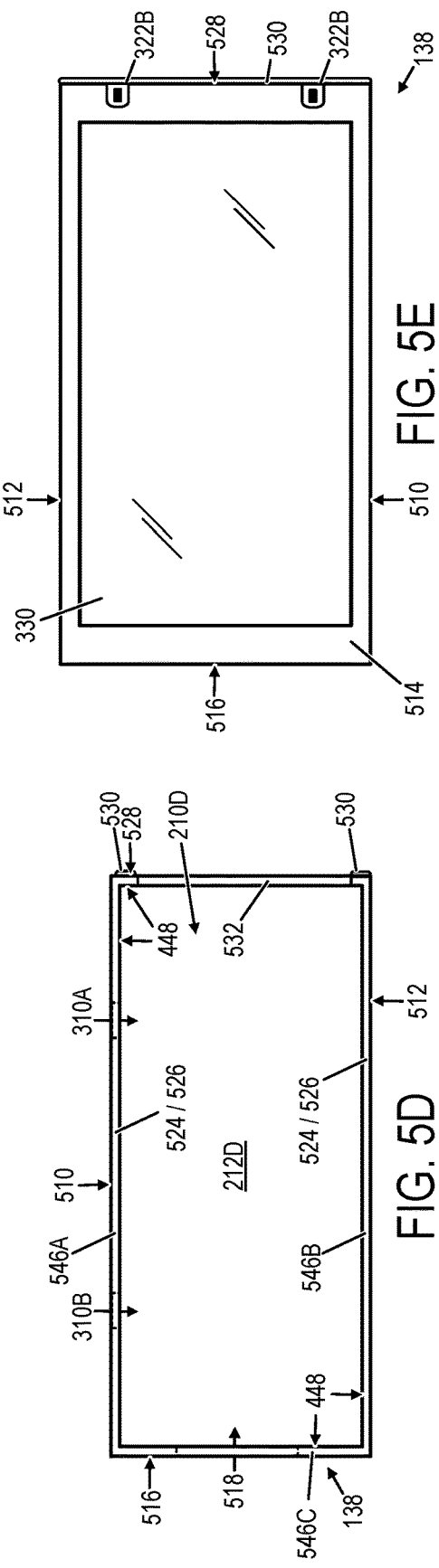

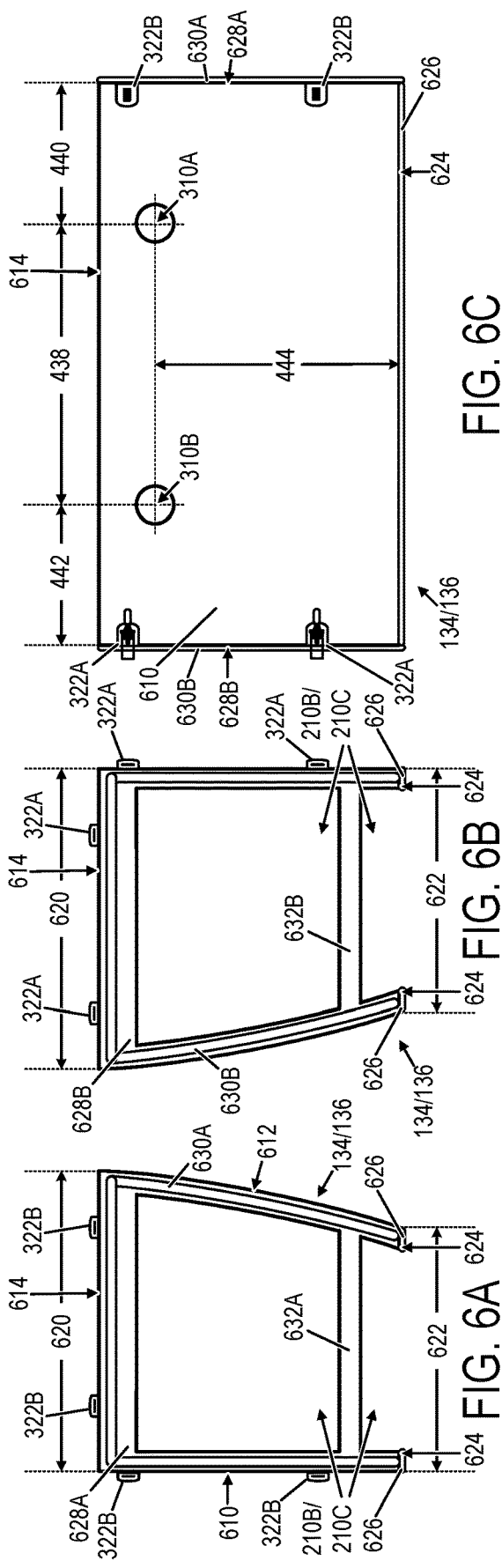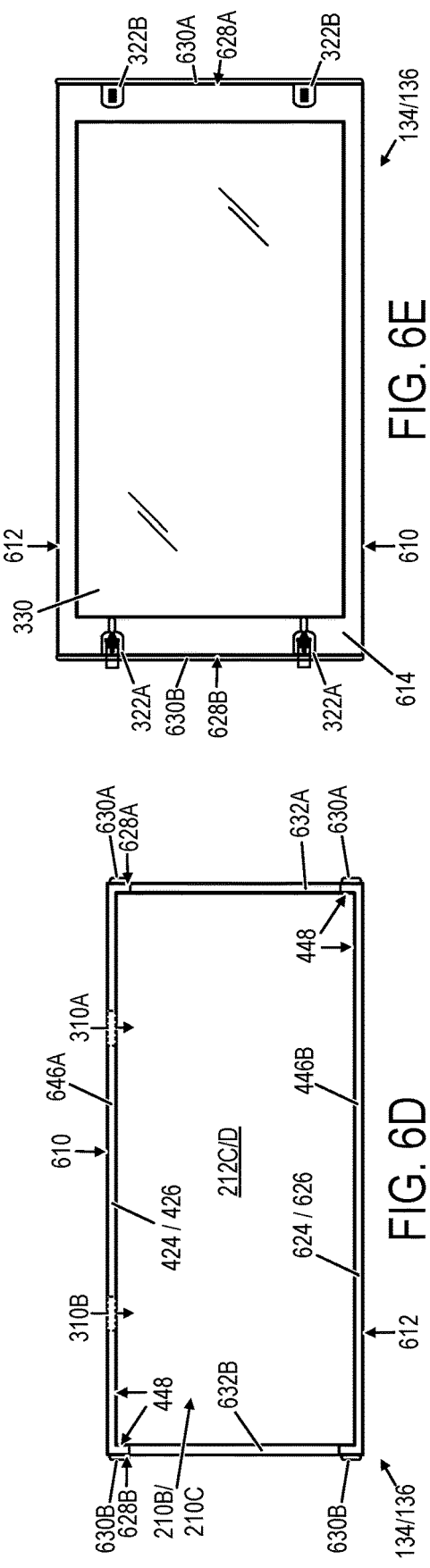

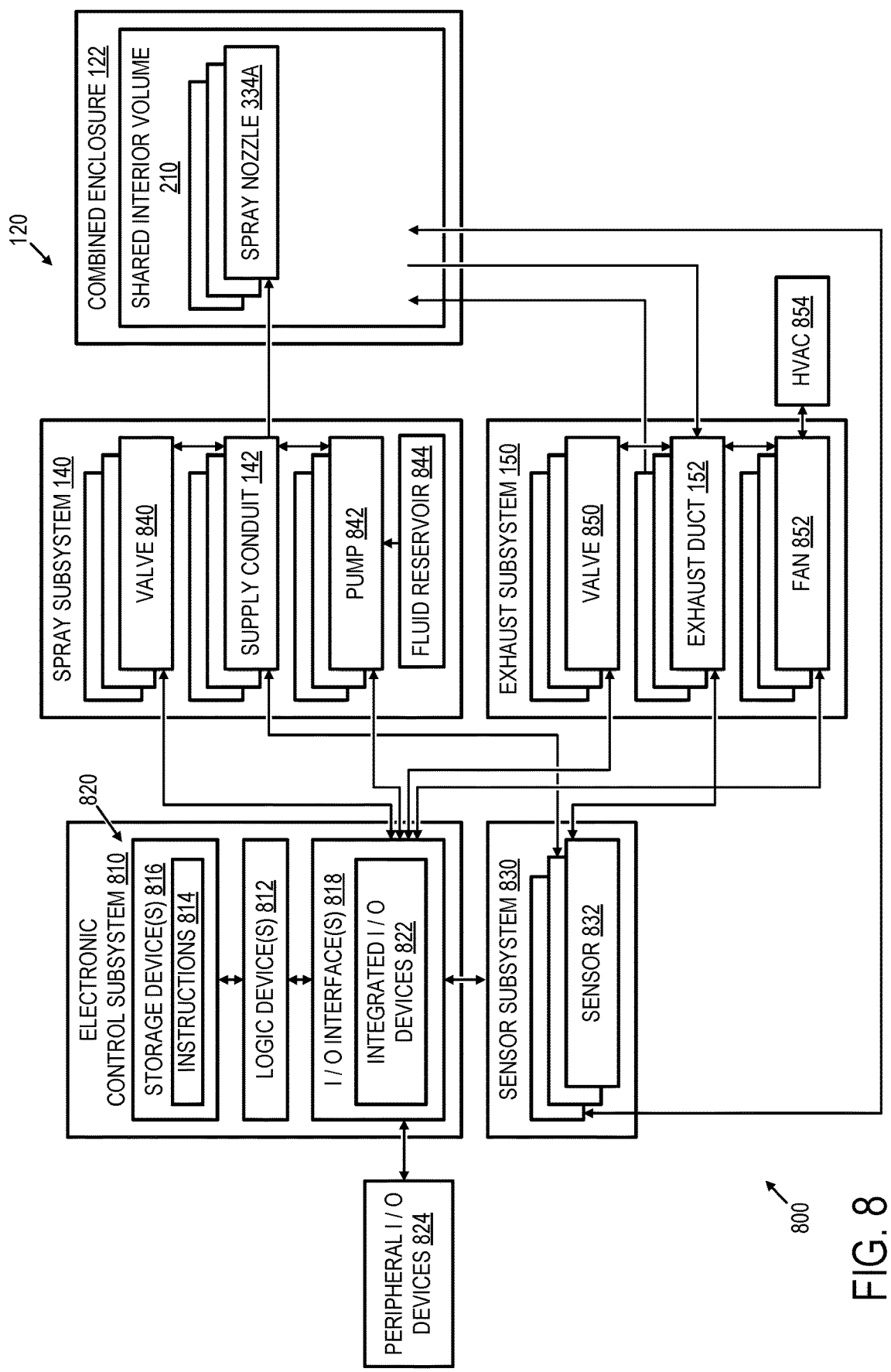

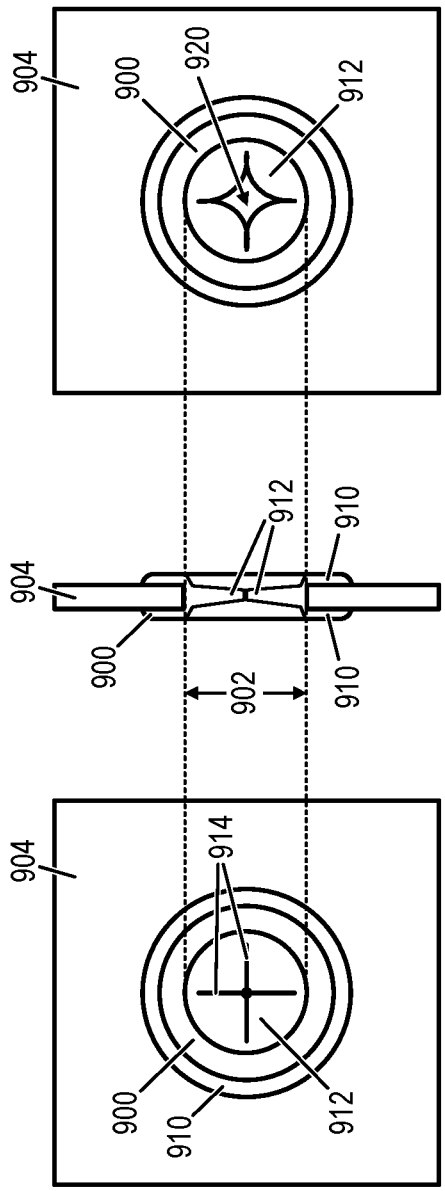
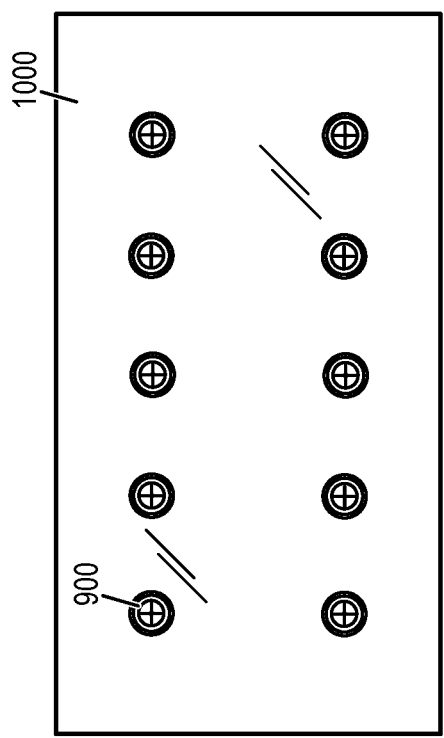

SPRAY APPLICATION SYSTEM AND METHOD FOR APPLYING A SPRAY TREATMENT

CROSS REFERENCE TO RELATED APPLICATIONS

This application is a divisional of U.S. patent application Ser. No. 16/902,043, filed Jun. 15, 2020, the entirety of which is hereby incorporated herein by reference for all purposes.

FIELD

An invention of the present disclosure relates generally to a spray application system for containing a spray treatment applied to a structure, such as an airframe of an aircraft.

BACKGROUND

The manufacture of a variety of products includes the use of spray treatments of paint, sealants, or other surface treatments. Within the context of aircraft manufacturing, for example, a wing may be joined to a fuselage of the aircraft along a boundary that is then primed and sealed within an interior of the fuselage. The application of spray treatments, particularly within interior spaces can create an environment of airborne material from which workers may require separation. Interior work spaces that confine or limit egress of workers offer challenges for maintaining compliance with certain measures and requirements.

One approach for separating workers from airborne materials includes the use of personal protection equipment (PPE) in the form of masks, respirators, eye wear, and other body coverings. Even with workers donning PPE, the surrounding work environment may also need to be separated from airborne materials and comply with certain measures and requirements. To address this issue, items to which a spray treatment is applied are typically enclosed within a containment structure within which workers wearing PPE apply the spray treatment.

SUMMARY

According to an example of the present disclosure, a spray application system is provided for applying a spray treatment onto a surface of an airframe of an aircraft. The spray application system includes a set of multiple modular hood units that are combinable to form a combined enclosure that defines a shared interior volume. Each modular hood unit of the set includes one or more enclosure walls. At least two airframe-interfacing edges of each modular hood unit define a portion of a spray treatment region of the airframe. At least one inter-unit-interfacing edge of each modular hood unit is configured to interface with another inter-unit-interfacing edge of a neighboring modular hood unit of the set to form at least a portion of the combined enclosure. A spray access port is defined within an enclosure wall of each modular hood unit that provides an opening between the shared interior volume and an exterior of the combined enclosure.

According to another example of the present disclosure, method of applying a spray treatment onto a surface of an airframe of an aircraft is provided. The method uses a set of multiple modular hood units in which each modular hood unit of the set includes one or more enclosure walls that partially define a combined enclosure having a shared interior volume. The method includes assembling the set of multiple modular hood units to define the combined enclosure. Assembly is performed by, for each modular hood unit of the set: interfacing the airframe with at least two airframe-interfacing edges of the modular hood unit to define a portion of a spray treatment region of the airframe, and interfacing at least one inter-unit-interfacing edge of the modular hood unit with at least another inter-unit-interfacing edge of a neighboring modular hood unit of the set to form at least a portion of the combined enclosure. The method further includes spraying a treatment fluid onto a surface of the airframe within the spray treatment region bounded by the combined enclosure, and exhausting air from the shared interior volume of the combined enclosure via a duct port of at least one modular hood unit of the set while spraying the treatment fluid.

The features and techniques discussed in this summary can be provided independently in various examples or may be combined in yet other examples, further details of which are described with reference to the following description and drawings.

BRIEF DESCRIPTION OF THE DRAWINGS

FIG. 3A shows a front view of the example combined enclosure of FIG. 1, including multiple modular hood units.

FIG. 3B shows a top view of the example combined enclosure of FIG. 1, including multiple modular hood units that accommodate features of the airframe.

FIG. 3C shows a top view of the example combined enclosure of FIG. 1, including multiple modular hood units that accommodate alternative features of the airframe.

FIGS. 4A-4E show various views of an example hood unit that forms a first end portion of the combined enclosure of FIG. 1.

FIGS. 5A-5E show various views of an example hood unit that forms a second end portion of the combined enclosure of FIG. 1.

FIGS. 6A-6E show various views of an example hood unit that forms an intermediate portion of the combined enclosure of FIG. 1.

FIG. 8 is a schematic diagram depicting additional components that can be included in the example spray application system of FIG. 1.

FIGS. 9A-C show various views of an example access port cover for the modular hood units of FIG. 1.

FIG. 10 shows an example wall portion that can be used for the walls or wall portions of the modular hood units of FIG. 1.

DETAILED DESCRIPTION

A spray treatment system and method of its operation are disclosed herein that can be used, as an example, to apply a spray treatment onto a surface of an airframe of an aircraft or other large-scale object while providing local containment of airborne material. The spray treatment system and method have the potential to apply a spray treatment while locally containing airborne material within a region to which the spray treatment is being applied. More specifically, the present disclosure describes using a set of modular hood units that are combinable to form a combined enclosure. The local containment of airborne material can enable workers to remain outside of the enclosure formed by the modular hood units, which can improve mobility and egress for the workers.

In at least some examples, the multiple modular hood units can be individually moved or manipulated by workers during assembly of the combined enclosure. Furthermore, the multiple modular hood units can be specifically configured to accommodate features of the object to which the surface treatment is to be applied. Using the multiple modular hood units to form the combined enclosure has the potential to reduce the cost, time, and resources associated with applying spray treatments, particularly for large-scale structures, such as aircraft.

Figure 1:
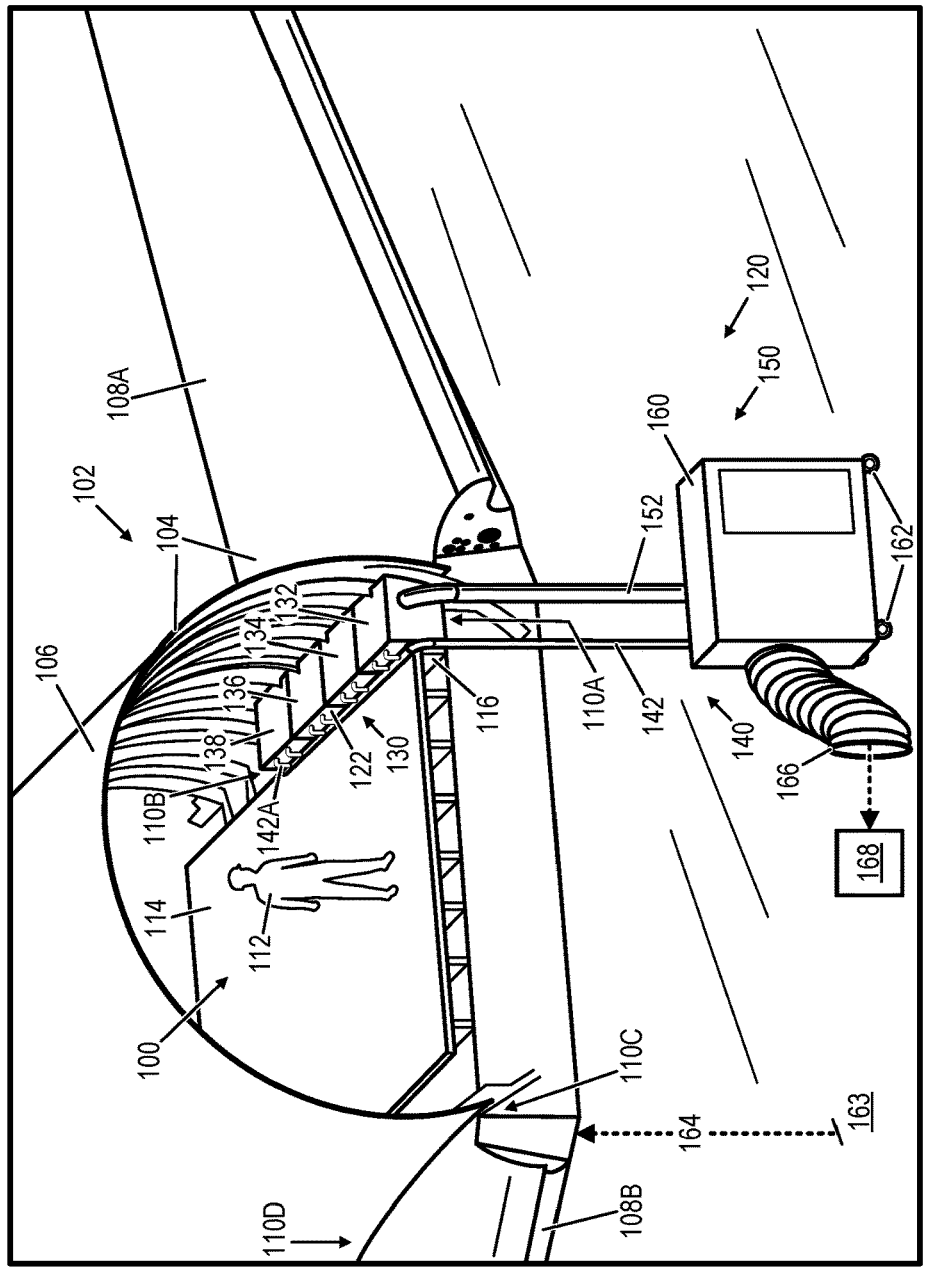
FIG. 1 shows an example work environment in which an example spray application system is used to apply a spray treatment onto a surface of an airframe of an aircraft using a combined enclosure formed from multiple modular hood units.

FIG. 1 shows an example work environment 100 in which an example aircraft 102 is being manufactured. Aircraft 102 takes the form a commercial passenger aircraft in this example. However, aircraft 102 may take other suitable forms or include a different type of large-scale object (e.g., a vehicle or marine vessel). An airframe 104 of aircraft 102 includes a fuselage 106 and a wing 108A that has been joined to the fuselage along a boundary indicated between reference numerals 110A and 110B that is to be primed and sealed with one or more spray treatments. Airframe 104 includes another wing 108B that has been joined to fuselage 106 along a boundary indicated between reference numerals 110C and 110D, which is to be similarly primed and sealed. Within FIG. 1, a human worker 112 is shown (for purposes of depicting scale) standing on a temporary work platform 114 within fuselage 106.

FIG. 1 further depicts an example spray application system 120, consistent with the present disclosure, that can be used to apply a spray treatment onto airframe 104 while also providing local containment of airborne materials. Spray application system 120 includes a set of multiple modular hood units 130 that are combinable to form a combined enclosure 122 defining a shared interior volume 210 (depicted in FIG. 2). Combined enclosure 122 formed by the set of multiple modular hood units 130 is configured to contain airborne materials from spray treatments within shared interior volume 210.

In this example, combined enclosure 122 is formed by a first end modular hood unit 132, two intermediate modular hood units 134 and 136, and a second end modular hood unit 138. A variety of different combinations of two or more modular hood units can be used to form combined enclosures having other suitable shapes and sizes, as described in further detail herein. Furthermore, in at least some examples, an enclosure can be formed from an individual hood unit, such as by incorporating the features of first end modular hood unit 132 and second end modular hood unit 138 into a single integrated modular hood unit.

In the example depicted in FIG. 1, combined enclosure 122 is installed within fuselage 106 between an exterior wall of the fuselage and a seat track structure 116 to which passenger seats are to be mounted. However, combined enclosures formed by multiple modular hood units consistent with the present disclosure can be installed at other locations of the airframe to which spray treatments are to be applied. Another combined enclosure (e.g., a mirror image of combined enclosure 122) can be used to apply a spray treatment to a spray treatment region along the boundary indicated between reference numerals 110C and 110D consistent with the configurations and techniques described herein for combined enclosure 122.

Spray application system 120 further includes a spray subsystem 140 including a supply conduit 142 that delivers a treatment fluid to one or more spray nozzles (e.g., spray nozzles 334A and 334B of FIGS. 3B and 3C) disposed within combined enclosure 122. In the example depicted in FIG. 1, supply conduit 142 includes multiple branches (of which branch 142A is an example) that supply treatment fluid to multiple spray nozzles installed within combined enclosure 122 (e.g., in a plumbed configuration).

In other examples described herein, a worker located within work environment 100 on the outside of shared enclosure 122 can manually apply a spray treatment within the enclosure by sequentially inserting a spray nozzle through a spray access port of the enclosure's wall, applying a spray treatment, and moving to a next spray access port of the enclosure wall to repeat the process.

Spray application system 120 further includes an exhaust subsystem 150 including at least one exhaust duct 152 interfacing with a modular hood unit of combined enclosure 122 for exhausting airborne materials from the shared interior volume of the enclosure. In at least some examples, exhaust subsystem 150 can be used to reduce the air pressure within the combined enclosure to less than the surrounding work environment outside of the enclosure. This reduction in pressure within the enclosure can further improve containment of airborne materials that may otherwise escape through gaps between the airframe and the enclosure or through spray access ports of the enclosure walls.

Spray subsystem 140 and exhaust subsystem 150 include additional components depicted in further detail in FIG. 8, including pumps, fans, valves, etc. These additional components can be housed within a cabinet 160 or other shared enclosure, in at least some examples. Cabinet 160 can take the form of a mobile enclosure, for example, by including a set of casters 162 or wheels that enables the enclosure to be rolled between locations within a manufacturing facility.

Within FIG. 1, airframe 104 is raised above a ground surface 163 upon which cabinet 160 rests, as indicated schematically by a height dimension 164. Supply conduit 142 and exhaust duct 152 can connect cabinet 160 with combined enclosure 122 using rigid and/or flexible segments.

Cabinet 160 can also interface with other systems via ducting 166, such as an exhaust system 168, for example, located downstream of cabinet 160 that is integrated with a building or other facility that houses aircraft 102. Exhaust system 168 can provide a pathway for exhaust gases from the combined enclosure to be removed from the work environment or the facility as a whole.

The use of flexible conduit and/or ducting for fluid connections, such as the conduit 142, supply duct 152, ducting 166, etc. enables cabinet 160 to be moved within the work environment while continuing to supply treatment fluid and exhaust services to combined enclosure 122.

Figure 2:
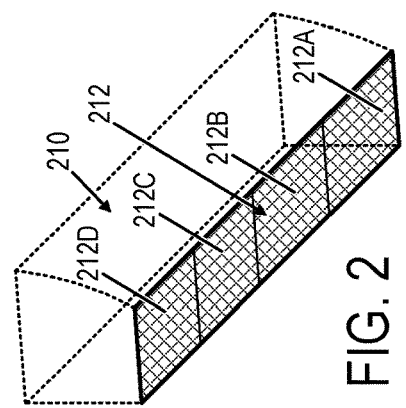
FIG. 2 shows a simplified view of a shared interior volume that is defined by the combined enclosure of FIG. 1.

FIG. 2 shows a simplified view of shared interior volume 210 that is defined by combined enclosure 122 of FIG. 1. FIG. 2 also shows a simplified view of a spray treatment region 212 of airframe 104 of FIG. 1 to which spray treatments are applied. For example, region 212 corresponds to an interior surface of airframe 104 located between seat track structure 116 and an exterior wall of the fuselage 106. Within FIG. 2, spray treatment region 212 includes portion 212A that is bounded by modular hood unit 132, portion 212B that is bounded by modular hood unit 134, portion 212C that is bounded by modular hood unit 136, and portion 212D that is bounded by modular hood unit 138. By varying the quantity and configuration of modular hood units used to form a combined enclosure, the size and shape of the spray treatment region can be varied to include or exclude particular features and regions of the airframe.

FIGS. 3A-3C show various views of combined enclosure 122 of FIG. 1 formed by combining modular hood units 132, 134, 136, and 138. Additional examples of combined enclosures are described in further detail with reference to FIGS. 11A-11D.

FIG. 3A shows a front view of combined enclosure 122 of FIG. 1 in which two spray access ports are included in each of the modular hood units, indicated, for example, at 310A and 310B with respect to first end modular hood unit 132. Instances of spray access ports that are defined within enclosure walls of each modular hood unit provide an opening between the shared interior volume and an exterior of the combined enclosure through which a spray nozzle can be inserted. Modular hood units can include other suitable quantities and arrangements of spray access ports, as will be described in further detail with reference to FIG. 10. Furthermore, as described in further detail with reference to FIG. 9, spray access ports of the modular hood units can include an access port cover that fully or partially seals the spray access ports while also allowing spray nozzles to be selectively inserted into the combined enclosure.

FIG. 3A also shows the modular hood units of combined enclosure 122 secured to each other by fasteners, indicated, for example, at 320 with respect to modular hood units 132 and 134. As an example, fastener 320 takes the form of a toggle clamp or draw latch having a first portion 322A (e.g., including a bail and lever) mounted to a first modular hood unit (e.g., 132) and a second portion 322B (e.g., including a catch portion for the bail) mounted to a neighboring modular hood unit (e.g., 134). However, other suitable fasteners can be used, such as a cleat and cord, opposing flanges of the modular hood units that are bolted or screwed together, etc. Fastener 320 can be selected to enable modular hood units to be quickly and easily secured to each other during assembly of the combined enclosure, and during disassembly following use of the combined enclosure.

FIG. 3A further shows how combined enclosure 122 can interface with multiple exhaust ducts in which exhaust duct 152 of FIG. 1 is depicted as exhaust duct 152A interfacing with first end modular hood unit 132 and another exhaust duct 152B interfaces with second end modular hood unit 138 for exhausting airborne materials from the combined enclosure.

FIG. 3B shows a top view of combined enclosure 122 of FIG. 1 in which modular hood units 132, 134, 136, and 138 each including a wall portion 330 that opens to permit access to the shared interior volume 210 of the combined enclosure. For example, first end modular hood unit 132 is shown with an instance of wall portion 330 opened to reveal portion 212A of spray treatment region 212 of the airframe. In this example, wall portion 330 take the form of an access panel that is mounted to modular hood unit 134 by hinges 332A and 332B.

In at least some examples, portions of the modular hood unit walls are formed from a transparent material, such as a clear plastic or glass that enable workers to view spray treatment region 212 through the portion of the wall. For example, wall portion 330 in this example can be formed from a transparent material. However, other walls of the modular hood units can be partially or entirely formed from a transparent material.

FIG. 3B also shows an example in which spray nozzles 334A and 334B are inserted through spray access ports 310A and 310B, respectively. Spray nozzles 334A and 334B can be operated while wall portion 330 is closed to apply a spray treatment to portion 212A of spray treatment region 212. In at least some examples, each modular hood unit includes one or more spray nozzles mounted to the modular hood unit at an orientation that directs the spray treatment from the spray nozzle toward the portion of the spray treatment region of the airframe of that modular hood unit. In each of these examples, a worker can operate the spray nozzles to apply spray treatment while residing on an exterior side of the combined enclosure opposite the shared interior volume within which the spray treatment is contained.

The top view of FIG. 3B also shows the modular hood units of combined enclosure 122 secured to each other by additional instances of previously described fastener 320.

FIG. 3C shows another top view of shared enclosure 122, including the previously described features of FIGS. 3A and 3B. However, in this example, modular hood units 132, 134, 136, and 138 accommodate a different set of features of airframe 104, represented schematically in FIG. 3C at 340A-340F to effectively contain airborne materials from contaminating the surrounding work environment. Airframe features 340A-340F, in this example, represent structural members that protrude from an interior surface of fuselage 106.

FIG. 3C provides an example of each modular hood unit of combined enclosure 122 being specifically configured to be used at a particular location within the airframe. In at least some examples, the modular hood units are modified during installation to accommodate specific features of the airframe, for example, by cutting away wall portions of the modular hood units that interfere with airframe features 340A-340F. As an example, intermediate modular hood units 134 and 136 initially have the same configuration prior to being modified for their specific use locations. For example, unit 134 accommodates airframe features 340B and 340C, whereas unit 136 accommodates airframe feature 340D.

FIGS. 4A-4E show various views of first end modular hood unit 132 of combined enclosure 122 in which FIG. 4A shows a first side view, FIG. 4B shows a second side view opposite the first side view of FIG. 4A, FIG. 4C shows a front view, FIG. 4D shows a bottom view, and FIG. 4E shows a top view opposite the bottom view of FIG. 4D. Within FIGS. 4A-4E, unit 132 includes a front wall 410, a rear wall 412, an upper wall 414, and a side wall 416 that collectively define a portion 210A of shared interior volume 210. The walls of modular hood units described herein can be formed of sheet metal (e.g., steel, aluminum, etc.), a polymer, a composite material, etc., as examples. Furthermore, in at least some examples, the walls of the modular hood units described herein can be formed by stretching a flexible material (e.g., a fabric or plastic sheeting) over a rigid frame.

Within the first side view of FIG. 4A, side wall 416 defines a duct port 418 that interfaces with exhaust duct 152A of FIG. 3A. FIG. 4A also shows rear wall 412 having a curved profile in which width 420 of upper wall 414 is greater than width 422 of a base 424 of the unit. The curved profile of rear wall 412 accommodates the curved interior of fuselage 106 of FIG. 1.

An airframe-interfacing seal 426 is shown in FIG. 4A that is included along airframe-interfacing edges of base 424 to increase containment of airborne materials along the unit-airframe interface. Airframe-interfacing seal 426 can be formed from an elastomeric material (e.g., a polymer or rubber), a foam, an adhesive strip or bead, an inflatable tube, or can be omitted in other examples.

Furthermore, in examples where rear wall 412 is omitted (e.g., to expose a corresponding region of the airframe for spray treatments), an airframe-interfacing edge of modular hood unit 132 that defines the perimeter of rear wall 412 can also include an airframe-interfacing seal to increase containment of airborne materials along this additional unit-airframe interface.

Within the second side view of FIG. 4B, an inter-unit-interfacing edge 428 of unit 132 is visible that is configured to interface with another inter-unit-interfacing edge of a neighboring modular hood unit (e.g., unit 134).

An inter-unit interfacing seal 430 is shown in FIG. 4B that is included along inter-unit-interfacing edge 428 to improve containment of airborne materials along the inter-unit interface.

FIG. 4B further shows instances of a fastener portion (e.g., 322A) mounted upon upper wall 414 and front wall 410 that can be used to secure unit 132 to a neighboring modular hood unit (e.g., unit 134).

Also, within FIG. 4B, portion 210A of shared interior volume 210 defined by unit 132 is visible. FIG. 4B also shows an example of a cross brace 432 that can be included between front wall 410 and rear wall 412. In this example, cross brace 432 spans portion 210A of the shared interior volume above base 424 to avoid obstructing the application of spray treatments onto the airframe. In another example, cross brace 432 instead forms part of base 424.

Within the front view of FIG. 4C, example spray access ports 310A and 310B are shown. While unit 132 includes two spray access ports in this example, it will be understood that unit 132 can have one spray access port, or more than two spray access ports in other examples. In at least some examples, to provide equal spacing of spray access ports along combined enclosure 122, an inter-port spacing distance 438 can be equal to twice an edge distance 440 between inter-unit-interfacing edge 428 and spray access port 310B located nearest to edge 428, and twice an edge distance 442 between side wall 416 and spray access port 310A located nearest to side wall 416.

Other modular hood units of the combined enclosure can include the same inter-port spacing distance 438 and edge distances 440 and 442 for their respective spray access ports. However, it will be understood that other suitable spacing of spray access ports can be used. FIG. 4C further shows spray access ports 310A and 310B located at a height 444 relative to base 424. Height 444 may be selected to provide adequate clearance for the spray access ports relative to features of the airframe or work environment, such as temporary work platform 114 of work environment 100 and/or seat track structure 116 of aircraft 102 of FIG. 1, as examples.

Within the bottom view of FIG. 4D, airframe-interfacing edges 446A, 446B, and 446C of base 424 define portion 212A of spray treatment region 212 of the airframe depicted in FIG. 2. Thus, portion 212A of the spray treatment region is bounded on opposite sides by edges 446A and 446B, and on a first end of the combined enclosure by edge 446C.

In at least some examples, interior wall surfaces of the modular hood units described herein can by covered with a liner 448 that is removable after a spray treatment is performed to protect the interior wall surfaces from the spray treatment and to expedite cleaning of the unit for subsequent use. In an example, the liner can be formed of plastic sheeting or film.

Within the top view of FIG. 4E, wall portion 330 of upper wall 414 is formed from a transparent material, enabling a worker to view the interior shared volume and spray treatment region of the airframe from a vantage point that is external the combined enclosure. However, transparent materials can be omitted from unit 132 in other examples.

FIGS. 5A-5E show various views of second end modular hood unit 138 of combined enclosure 122 of FIG. 1 in which FIG. 5A shows a first side view, FIG. 5B shows a second side view opposite the first side view of FIG. 5A, FIG. 5C shows a front view, FIG. 5D shows a bottom view, and FIG. 5E shows a top view opposite the bottom view of FIG. 5D. Within FIGS. 5A-5E, unit 138 includes a front wall 510, a rear wall 512, an upper wall 514, and a side wall 516 that collectively define a portion 210D of shared interior volume 210.

In at least some examples, second end modular hood unit 138 has a configuration that is symmetrical to first end modular hood unit 138 (e.g., about a plane of inter-unit-interfacing edge 428). However, unit 138 can have other suitable configurations, for example, to accommodate specific features of the airframe that differ from the features of the airframe that are accommodated by unit 132 at their respective installed locations.

Within the first side view of FIG. 5A, side wall 516 defines a duct port 518 that interfaces with exhaust duct 152B of FIG. 3A. Duct port 518 can be omitted in at least some examples, such as where one or more other modular hood units of the combined enclosure define a duct port.

FIG. 5A also shows rear wall 512 having a curved profile in which width 520 of upper wall 514 is greater than width 522 of a base 524 of the unit. The curved profile of rear wall 512 accommodates the curved interior of fuselage 106 of FIG. 1.

An airframe-interfacing seal 526 is shown in FIG. 5A that is included along the airframe-interfacing edges of base 524.

Within the second side view of FIG. 5B, an inter-unit-interfacing edge 528 of unit 138 is visible that is configured to interface with another inter-unit-interfacing edge of a neighboring modular hood unit (e.g., unit 136). An inter-unit interfacing seal 530 is shown in FIG. 5B that is included along inter-unit-interfacing edge 528.

FIG. 5B further shows instances of fastener portion 322B mounted upon upper wall 514 and front wall 510 that can be used to secure unit 138 to a neighboring modular hood unit (e.g., unit 136).

Also, within FIG. 5B, portion 210D of the shared interior volume defined by unit 138 is visible.

FIG. 5B also shows an example of a cross brace 532 that can be provided between front wall 510 and rear wall 512. As previously described with reference to cross brace 432 of FIG. 4, cross brace 532 can span portion 210D of the shared volume above base 524 or can instead form part of base 524.

Within the front view of FIG. 5C, example spray access ports 310A and 310B are shown. Spray access ports 310A and 310B can have the same inter-port spacing distance 438, edge distances 440 and 442, height 444 as previously described with reference to FIG. 4C. However, it will be understood that other suitable spacing and/or configurations of spray access ports can be used.

Within the bottom view of FIG. 5D, airframe-interfacing edges 546A, 546B, and 546C of base 524 define portion 212D of spray treatment region 212 of the airframe. Thus, portion 212D of the spray treatment region is bounded on opposite sides by edges 546A and 546B, and on a second end of the combined enclosure by edge 546C.

Within the top view of FIG. 5E, wall portion 330 of upper wall 514 is formed from a transparent material, enabling a worker to view the interior shared volume and spray treatment region of the airframe from a vantage point that is external the combined enclosure. However, transparent materials can be omitted from unit 138 in other examples.

FIGS. 6A-6E show various views of either of intermediate modular hood units 134 or 136 of combined enclosure 122 of FIG. 1 in which FIG. 6A shows a first side view, FIG. 6B shows a second side view opposite the first side view of FIG. 6A, FIG. 6C shows a front view, FIG. 6D shows a bottom view, and FIG. 6E shows a top view opposite the bottom view of FIG. 6D. Within FIGS. 6A-6E, unit 136/138 includes a front wall 610, a rear wall 612, and an upper wall 614 that collectively defines a portion 210B (in the case of unit 134) or 210C (in the case of unit 136) of shared interior volume 210.

In at least some examples, intermediate modular hood units 134 and 136 have a similar configuration (e.g., are instances of the same model). Thus, multiple instances of the same configuration of an intermediate modular hood unit can be used to define a spray treatment region of the airframe having any suitable size. However, units 134 and 136 can have other suitable configurations, for example, to accommodate specific features of the airframe as previously described with reference to FIG. 3C.

Within the first side view of FIG. 6A, an inter-unit-interfacing edge 628A of unit 134/136 is visible that is configured to interface with another inter-unit-interfacing edge of a neighboring modular hood. For modular hood unit 134, for example, inter-unit-interfacing edge 628A interfaces with inter-unit-interfacing edge 428 of unit 132 to form combined enclosure 122.

An inter-unit interfacing seal 630A is shown in FIG. 6A that is included along inter-unit-interfacing edge 628A. Inter-unit interfacing seal 630A can be omitted, for example, if its neighboring unit includes an inter-unit interfacing seal.

FIG. 6A also shows rear wall 612 having a curved profile in which width 620 of upper wall 614 is greater than width 622 of a base 624 of the unit. The curved profile of rear wall 612 accommodates the curved interior of fuselage 106 of FIG. 1. An airframe-interfacing seal 626 is shown in FIG. 6A that is included along the airframe-interfacing edges of base 624.

Within the second side view of FIG. 6B, an inter-unit-interfacing edge 628B of unit 134/136 is visible that is configured to interface with another inter-unit-interfacing edge of a neighboring modular hood unit. As an example, an instance of inter-unit-interfacing edge 628B of unit 134 interfaces with an instance of inter-unit-interfacing edge 628A of modular hood unit 136 to form combined enclosure 122. For modular hood unit 136, an instance of inter-unit-interfacing edge 628B of unit 136 interfaces with inter-unit-interfacing edge 528 of modular hood unit 138 to form combined enclosure 122.

An inter-unit interfacing seal 630B is shown in FIG. 6B that is included along inter-unit-interfacing edge 628B. Again, inter-unit interfacing seal 630B can be omitted, for example, if its neighboring unit includes an inter-unit interfacing seal.

FIGS. 6A and 6B further shows instances of fastener portions 322A and 322B mounted upon upper wall 614 and front wall 610 that can be used to secure unit 136/138 to neighboring modular hood units.

Also, within FIG. 6B, portions 210B or 210C of the shared interior volume defined by unit 138 are visible.

FIGS. 6A and 6B also show an example of cross braces 632A and 632B, respectively, that can be provided between front wall 610 and rear wall 612. As previously described with reference to cross brace 432 of FIG. 4, cross braces 632A and 632B can span portion 210B/210C of the shared volume above base 624 or can instead form part of base 624.

Within the front view of FIG. 6C, example spray access ports 310A and 310B are shown. Spray access ports 310A and 310B can have the same inter-port spacing distance 438, edge distances 440 and 442, height 444 as previously described with reference to FIG. 4C. However, it will be understood that other suitable spacing and/or configurations of spray access ports can be used.

Within the bottom view of FIG. 6D, airframe-interfacing edges 646A and 646B of base 624 define portion 212B or 212C of spray treatment region 212 of the airframe. Thus, portion 212B/212C of the spray treatment region is bounded on opposite sides of the modular hood unit by edges 646A and 646B.

Within the top view of FIG. 6E, wall portion 330 of upper wall 614 is formed from a transparent material, enabling a worker to view the interior shared volume and spray treatment region of the airframe from a vantage point that is external the combined enclosure. However, transparent materials can be omitted from units 134 and 136 in other examples.

Figure 7:
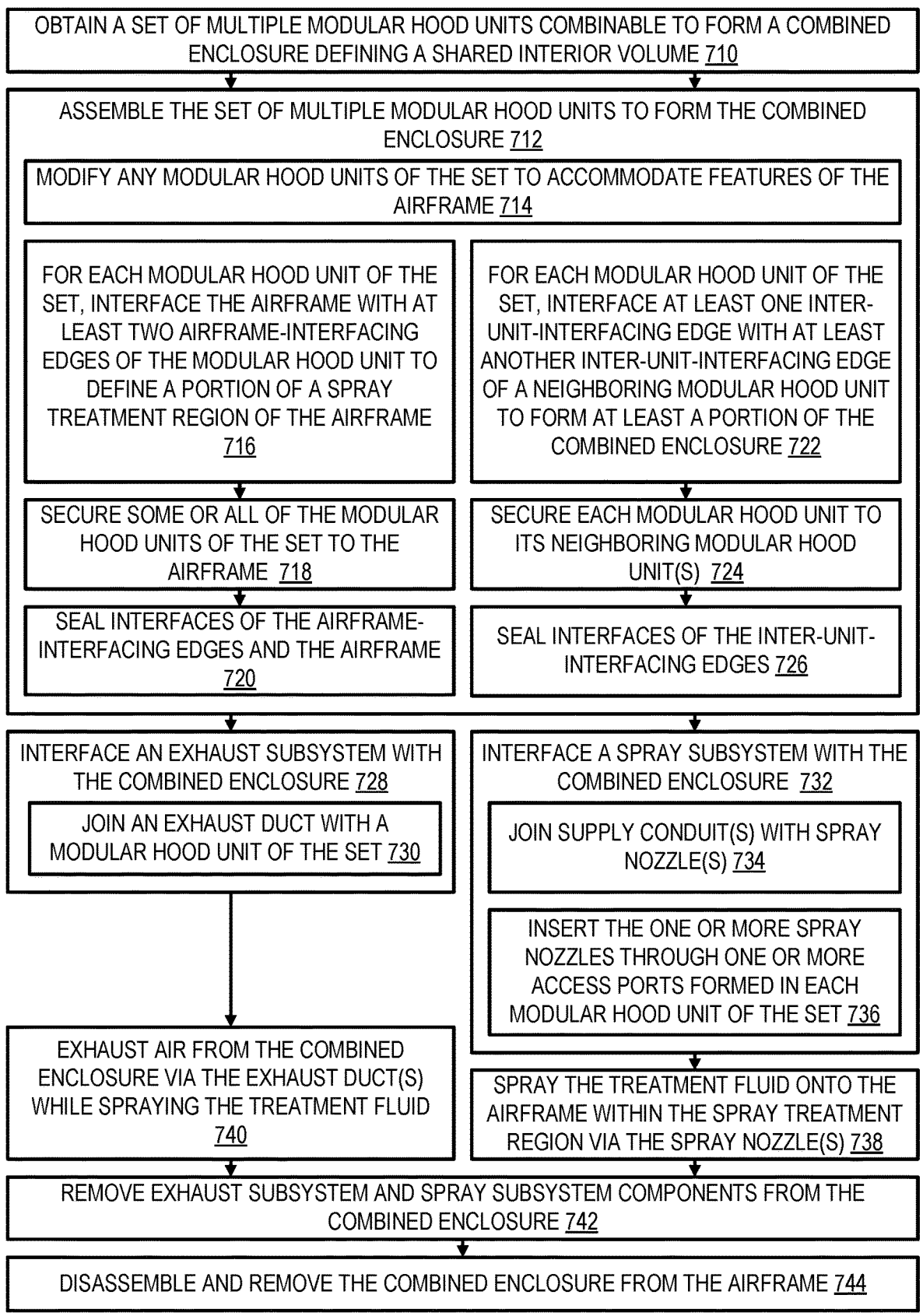
FIG. 7 is a flow diagram depicting an example method of applying a spray treatment onto a surface of an airframe of an aircraft using the spray application system of FIG. 1.

FIG. 7 is a flow diagram depicting an example method 700 of applying a spray treatment onto an interior surface of an airframe of an aircraft using spray application system 120 of FIG. 1. It will be understood that method 700 or portions thereof can be performed using spray application systems having different enclosure configurations than example combined enclosure 122.

At operation 710, the method includes obtaining a set of multiple modular hood units combinable to form a combined enclosure defining a shared interior volume. For example, combined enclosure 122 can be formed by obtaining previously modular hood units 132, 134, 136, and 138.

In at least some examples, the method at operation 710 includes manufacturing the modular hood units by applying walls to a frame to create a particular one of the modular hood units. For example, modular hood units 134, 136, 138, and 138 can each begin with a frame having the same configuration, and walls can be added or omitted from the frames to provide the different configurations of these units.

At operation 712, the method includes assembling the set of multiple modular hood units to form the combined enclosure. In at least some examples, as part of operation 712, any modular hood units that interfere with features of the airframe can be modified at operation 714 to accommodate the specific features of the airframe. For example, as previously described with reference to FIG. 3C, portions of the units can be cut away or otherwise modified to accommodate airframe features that are specific to the location of use of the units.

At operation 716, for each modular hood unit of the set, the method includes interfacing the airframe with at least two airframe-interfacing edges of the modular hood unit to define a portion of a spray treatment region of the airframe. For example, portions 212A, 212B, 212C, and 212D of FIG. 2 are each defined by two or more airframe-interfacing edges of their respective modular hood units.

Figures 11A, 11B, 11C, 11D:
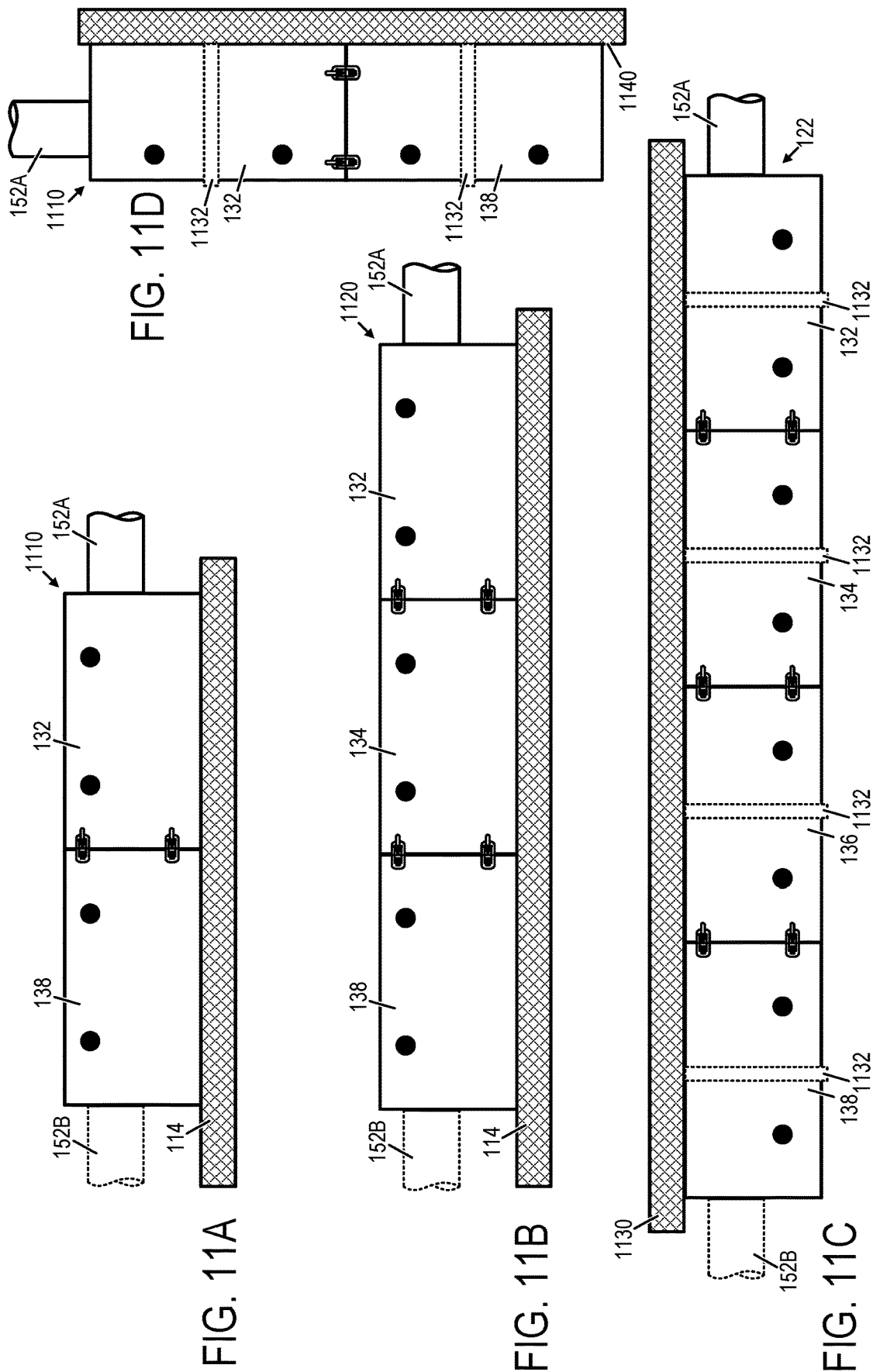
FIGS. 11A-11D show additional examples of how modular hood units can be combined and used.

In at least some examples, at operation 718, the method includes securing some or all of the modular hood units to the airframe. For example, fasteners, straps, or other suitable hardware can be used to secure modular hood units to the airframe. Operation 718 can be used to inhibit movement of the modular hood units relative to the airframe, particularly in examples where the modular hood units are arranged in a vertically stacked configuration or are suspended from overhanging surface of the airframe. FIGS. 11C and 11D depict examples of these alternative configurations. Operation 718 can be omitted in at least some examples.

At operation 720, the method includes sealing interfaces of the airframe-interfacing edges and the airframe. In examples where the airframe-interfacing edges include airframe-interfacing seals, the interfaces are partially or fully sealed by the interfacing operation performed at operation 716. Alternatively or additionally, sealing the interfaces at operation 720 can include applying a strip of sealing tape or bead of sealant (e.g., silicone caulk) along the interface between the modular hood units and the airframe.

Before, during, or after operations 716, 718, and 720 relating to the unit-airframe interfaces are performed, operations 722, 724, and 726 relating to inter-unit interfaces can be performed. At operation 722, for each modular hood unit of the set, the method includes interfacing at least one inter-unit interfacing edge with at least another inter-unit facing edge of a neighboring modular hood unit to at least form a portion of the combined enclosure. For example, edge 428 of unit 132 can be interfaced with edge 628A of unit 134 to form portions 210A and 210B of the combined enclosure.

As part of operation 722, for each of the one or more intermediate modular hood units of the combined enclosure, the method further includes interfacing a second inter-unit-interfacing edge of the unit with an inter-unit-interfacing edge of another neighboring modular hood unit. Operation 722 can be performed for each modular hood unit until the combined enclosure has been assembled.

In at least some examples, at operation 724, the method includes securing each modular hood unit to its one or more neighboring modular hood units. For example, fastener portions of neighboring modular hood units can be joined (e.g., latched) to secure the units to each other.

At operation 726, the method includes sealing the interfaces of the inter-unit-interfacing edges. In examples where the inter-unit-interfacing edges include inter-unit-interfacing seals, the interfaces are partially or fully sealed by the interfacing operation performed at operation 722. Alternatively or additionally, sealing the interfaces at operation 726 can include applying a strip of sealing tape or bead of sealant (e.g., silicone caulk) along the inter-unit interfaces between the modular hood units.

At operation 728, the method includes interfacing an exhaust subsystem with one or more duct ports of the combined enclosure. For example, at operation 730, exhaust duct 152A can be joined with duct port 418 of unit 132. Alternatively or additionally, at operation 730, exhaust duct 152B can be joined with duct port 518 of unit 138. In at least some examples, the exhaust ducts are secured to the duct ports of the combined enclosure using fasteners and/or sealed (e.g., using duct tape or sealant).

Before, during, or after operations 728 and 730 are performed, the method at operation 732 includes interfacing a spray subsystem with the combined enclosure. For example, at operation 734, one or more supply conduits (e.g., 142, 142A, etc.) can be joined to one or more spray nozzles (e.g., 334A, 334B, etc.). In at least some examples, the supply conduits or portions thereof are secured to the airframe and/or combined enclosure combined enclosure using fasteners and/or mounting brackets (e.g., in a plumbed configuration).

The spray nozzle may be incorporated into a hand operated sprayer, in at least some examples. Here, the supply conduit may join the hand operated sprayer with a cabinet (e.g., 160) or a wearable supply tank (e.g., backpack).

At operation 736, the method includes inserted the one or more spray nozzles through one or more spray access ports formed in each modular hood unit of the combined enclosure.

At operation 738, the method includes spraying the treatment fluid supplied to the nozzle(s) via the supply conduit(s) onto the airframe within the spray treatment region bounded by the combined enclosure.

While spraying the treatment fluid at operation 738, the method at operation 740 includes exhausting air and airborne material from the combined enclosure via the one or more exhaust ducts. Exhausting at operation 740 may be performed prior to and/or after spraying is performed at operation 738. In at least some examples, air is exhausted form the combined enclosure at operation 740 at a baseline flow rate that is increased while spraying is performed at operation 738.

After the spray treatment has been applied to the spray treatment region of the airframe, at operation 742, the exhaust subsystem and spray subsystem components are removed from the combined enclosure.

At operation 744, the combined enclosure can be disassembled and removed from the airframe.

FIG. 8 is a schematic diagram 800 depicting additional components that can form part of spray application system 120 of FIG. 1. For example, spray application system 120 can further include an electronic control subsystem 810 that controls operation of other components of the spray application system, such as spray subsystem 140 and/or exhaust subsystem 150.

Electronic control subsystem 810 includes one or more logic devices 812 (e.g., computer processors) that execute instructions 814 (e.g., programs) stored in one or more storage devices 816 (e.g., computer memory devices) to perform one or more operations.

Electronic control subsystem 810 further includes one or more input/output interfaces 818 by which logic devices 812 can communicate or interact with other components of the spray application system. In at least some examples, a combination of logic devices 812, storage devices 816 including instructions 814 stored thereon, and input/output interfaces 818 take the form of a computing system 820 of one or more computing devices.

Input/output interfaces 818 can include one or more integrated input and/or output devices 822. Additionally or alternatively, input/output interfaces 818 can interface one or more peripheral input and/or output devices (e.g., a smart phone or remote computer).

Examples of input devices include a touch-sensitive display device, touch-sensitive pad, keyboard, keypad, computer mouse, handheld controller, physical button, switch, or knob, microphone, camera, sensors, another computing device, etc. Input devices can be used to provide control input to electronic control subsystem 810, such as by input from human operators, sensor input, or input from another device.

Examples of output devices include a display device, indicator light, audio speaker, another computing device, a controlled component (e.g., valve or spray nozzle actuator), etc. Output devices can be used to output information to human operators of spray application system 120.

Electronic control subsystem 810 can be used in combination with a sensor subsystem 830 of spray application system 120. Sensor subsystem 830 includes one or more sensors of which sensor 832 is an example. The sensors of sensor subsystem 830 can form part of previously described integrated input/output devices 822 or peripheral input/output devices 824.

Within FIG. 1, one or more sensors (e.g., sensor 832) of sensor subsystem 830 can be used to measure one or more operating conditions associated with exhaust gases flowing through exhaust duct 152. One or more other sensors of sensor subsystem 830 can be used to measure operating conditions associated with treatment fluid supplied to spray nozzles (e.g., 334A) through supply conduit 142. One or more other sensors of sensor subsystem 830 can be used to measure operating conditions associated with shared interior volume 210 of combined enclosure 122.

One or more other sensors of sensor subsystem 830 can be used to measure operating conditions within a work environment surrounding the combined enclosure. Example operating conditions measured by sensors of sensor subsystem 830 include pressure, flow rate, temperature, concentration, humidity, visibility, etc. Examples of concentration include detecting the presence of airborne treatment materials or smoke within the combined enclosure or within the surrounding work environment. As an example, exhaust subsystem 150 can be controlled by electronic control subsystem 810 to maintain a target pressure (e.g., a pressure that is less than the surrounding environment) within shared interior volume 210 of combined enclosure 122 using feedback from a pressure sensor installed within the enclosure.

As another example, exhaust subsystem 150 provides heating and/or air conditioning to the combined enclosure (e.g., via duct 152B operated as an air supply duct) responsive to a temperature sensor installed within the enclosure, which can be used maintain a target temperature range within shared interior volume 210 for an applied spray treatment (e.g., during cure). Within FIG. 8, an HVAC unit 854 is schematically depicted. HVAC unit 854 can be included within cabinet 160 of FIG. 1, in at least some examples.

Additional components of spray subsystem 140 can include one or more valves (e.g., 840), one or more pumps (e.g., 842), and a fluid reservoir 844 from which a treatment fluid is supplied. Valve 840, as an example, can be operated to control pressure and/or flow rate of treatment fluid supplied from fluid reservoir 844 via pump 842 to one or more of the spray nozzles. Valve 840 can be located along or otherwise associated with a particular supply conduit (e.g., 142, 142A, etc.).

Additional components of exhaust subsystem 150 can include one or more valves (e.g., 850) and one or more fans (e.g., 852). Valve 850, as an example, can be operated to control a pressure of gases contained within shared interior volume 210 and/or a rate that gases are exhausted from the shared interior volume. Valve 850 can be located along or otherwise associated with a particular exhaust duct (e.g., 152A, 152B, etc.).

FIGS. 9A-C show various views of an example access port cover 900 for a spray access port 902 formed within a wall 904 of an enclosure or modular hood unit, including for any of the spray access ports disclosed herein. For example, spray access port 902 is an example of spray access ports 310A and 310B of FIG. 3A. FIGS. 9A and 9C show a view of a face of access port cover 900 from a perspective that faces wall 904, while FIG. 9B shows a side view of the access port cover through a section of the wall.

Access port cover 900 includes a body portion 910 by which the cover is mounted to the wall, and a diaphragm 912 that spans at least a portion of spray access port 902. In this example, diaphragm 912 includes one or more boundaries 914 (e.g., slits) that are moveable and/or deformable from the position depicted in FIG. 9A to the position depicted in FIG. 9C to enable a spray nozzle or supply conduit 920 (depicted schematically) to be inserted through spray access port 902 of wall 904. While a spray nozzle or supply conduit is insert through spray access port 902, diaphragm 912 reduces or eliminates the transfer of airborne materials through the spray access port, thereby aiding in containment of airborne materials within an enclosure.

In at least some examples, access port cover 900 or diaphragm 912 of the cover is formed from an elastomeric material, such as a polymer and/or rubber-based material. While a specific example of an access port cover is described with reference to FIGS. 9A-9C, other suitable access port covers of different configurations can be used to contain airborne materials within an enclosure. As an example, an access port cover can take the form of a plug or flap that covers the spray access port that is removed from the port or moved aside to provide open access to the port.

FIG. 10 shows an example wall portion 1000 that can be used for any of the walls or wall portions of the various enclosures and modular hood units described herein. In this example, multiple instances of access port cover 900 are provided within respective spray access ports of wall portion 1000. For example, wall portion 1000 includes a two-dimensional array access ports.

Also in the example of FIG. 10, wall portion 1000 is formed from a transparent material. In at least some examples, entire walls of an enclosure or modular hood unit can be formed by a transparent material, and can include spray access ports and covers that span the transparent material in one or two dimensions.

FIGS. 11A-11D show additional examples of how modular hood units can be combined and used. In FIG. 11A, modular hood units 132 and 138 are interfaced with each other (e.g., via inter-unit-interfacing edges 428 and 528) to form a smaller combined enclosure 1110 as compared to combined enclosure 122.

In FIG. 11B, modular hood units 132, 134, and 138 are assembled to form a combined enclosure 1120 of an intermediate size.

FIG. 11C shows combined enclosure 122 suspended from an overhanging portion 1130 of an airframe by straps 1132, enabling a spray treatment to be applied to a ceiling or other overhanging surface.

FIG. 11D shows modular hood units 132 and 138 assembled to form enclosure 1110 that is secured to vertical portion 1140 of an airframe by straps 1132, for example, to apply a spray treatment to a wall surface.

Examples of the subject matter of the present disclosure are described in the following enumerated paragraphs.

A.1 A spray application system for applying a spray treatment onto a surface of an airframe of an aircraft, the system comprising: a set of multiple modular hood units combinable to form a combined enclosure defining a shared interior volume, each modular hood unit of the set including: one or more enclosure walls, at least two airframe-interfacing edges defining a portion of a spray treatment region of the airframe, at least one inter-unit-interfacing edge configured to interface with another inter-unit-interfacing edge of a neighboring modular hood unit of the set to form at least a portion of the combined enclosure, and a spray access port defined within an enclosure wall of the modular hood unit that provides an opening between the shared interior volume and an exterior of the combined enclosure.

A.2 The system of paragraph A.1, wherein each modular hood unit of the set includes an access port cover spanning at least a portion of the spray access port.

A.3 The system of paragraph A.2, wherein the access port cover is deformable or moveable to accommodate insertion of a spray nozzle within the spray access port.

A.4 The system of any of paragraphs A.1-A.3, wherein the set of multiple modular hood units includes: a first end modular hood unit that forms a first end portion of the combined enclosure; and a second end modular hood unit that form a second end portion of the combined enclosure.

A.5 The system of paragraph A.4, wherein the set of multiple modular hood units further includes: one or more intermediate modular hood units that form an intermediate portion of the combined enclosure between the first end modular hood unit and the second end modular hood unit; wherein each of the one or more intermediate modular hood units further include a second inter-unit-interfacing edge configured to interface with an inter-unit-interfacing edge of another neighboring modular hood unit of the set.

A.6 The system of any of paragraphs A.1-A.5, wherein a modular hood unit of the set includes a duct port; and wherein the system further comprises an exhaust subsystem including an exhaust duct joined with the duct port for exhausting air from the combined enclosure.

A.7 The system of paragraph A.6, wherein the exhaust subsystem further includes: one or more fans that exhaust air from the combined enclosure via the exhaust duct.

A.8 The system of any of paragraphs A.1-A7, wherein each modular hood unit of the set is configured to be secured to a neighboring modular hood unit of the set via one or more fasteners.

A.9 The system of any of paragraphs A.1-A8, wherein each of the two airframe-interfacing edges of each modular hood unit of the set includes an airframe-interfacing seal.

A.10 The system of any of paragraphs A.1-A.9, further comprising: a spray subsystem including a supply conduit and a spray nozzle joined with the supply conduit; wherein the spray access port accommodates the spray nozzle or supply conduit.

A.11 The system of paragraph A.10, wherein the spray subsystem includes a plurality of spray nozzles joined with the supply conduit; wherein the spray access port of each modular hood unit of the set accommodates a respective spray nozzle of the plurality of spray nozzles.

A.12 The system of paragraph A.10, wherein the spray subsystem includes one or more pumps that supply treatment fluid to the spray nozzle via the supply conduit.

A.13 The system of any of paragraphs A.1-A.12, wherein at least a portion of an enclosure wall of each modular hood unit is formed from a transparent material.

A.14 The system of any of paragraphs A.1-A.13, wherein at least a portion of an enclosure wall of each modular hood unit opens to permit access to the shared interior volume of the combined enclosure.

B.1 A method of applying a spray treatment onto a surface of an airframe of an aircraft, the method using a set of multiple modular hood units, each modular hood unit of the set including one or more enclosure walls that partially defines a combined enclosure having a shared interior volume, the method comprising: assembling the set of multiple modular hood units to define the combined enclosure by, for each modular hood unit of the set: interfacing the airframe with at least two airframe-interfacing edges of the modular hood unit to define a portion of a spray treatment region of the airframe, and interfacing at least one inter-unit-interfacing edge of the modular hood unit with at least another inter-unit-interfacing edge of a neighboring modular hood unit of the set to form at least a portion of the combined enclosure; spraying a treatment fluid onto a surface of the airframe within the spray treatment region bounded by the combined enclosure; and exhausting air from the shared interior volume of the combined enclosure via a duct port of at least one modular hood unit of the set while spraying the treatment fluid.

B.2 The method of paragraph B.1, wherein the treatment fluid is sprayed via one or more spray nozzles; and wherein the method further comprises: inserting the one or more spray nozzles through one or more access ports formed in each modular hood unit of the set.

B.3 The method of any of paragraphs B.1-B.2, wherein the set of multiple modular hood units includes: a first end modular hood unit that forms a first end portion of the combined enclosure; a second end modular hood unit that form a second end portion of the combined enclosure; and one or more intermediate modular hood units that form an intermediate portion of the combined enclosure between the first end modular hood unit and the second end modular hood unit; wherein the method further comprises, for each of the one or more intermediate modular hood units, interfacing a second inter-unit-interfacing edge with an inter-unit-interfacing edge of another neighboring modular hood unit of the set.

B.4 The method of any of paragraphs B.1-B.3, further comprising: joining an exhaust duct for exhausting air from the combined enclosure with the duct port of at least one modular hood unit of the set.

B.5 The method of paragraph B.4, further comprising: while spraying the treatment fluid, operating one or more fans to exhaust the air via the exhaust duct and to reduce an air pressure within the combined enclosure below an air pressure outside of the combined enclosure.

C.1 A spray application system for applying a spray treatment onto a surface of an airframe of an aircraft, the system comprising: a set of multiple modular hood units combinable to form a combined enclosure defining a shared interior volume, each modular hood unit of the set including: one or more enclosure walls in which at least a portion of the one or more enclosure walls is formed from a transparent material, at least two airframe-interfacing edges defining a portion of a spray treatment region of the airframe, at least one inter-unit-interfacing edge configured to interface with another inter-unit-interfacing edge of a neighboring modular hood unit of the set to form at least a portion of the combined enclosure, and a spray access port defined within an enclosure wall of the modular hood unit that provides an opening between the shared interior volume and an exterior of the combined enclosure; a spray subsystem including a supply conduit and multiple spray nozzles interfacing with the supply conduit, each modular hood unit having a spray nozzle of the multiple spray nozzles mounted to the modular hood unit at an orientation that directs the spray treatment from the spray nozzle toward the portion of the spray treatment region of the airframe of that modular hood unit; and an exhaust subsystem including an exhaust duct interfacing with a duct port of at least one modular hood unit of the set for exhausting air from the shared interior volume of the combined enclosure.

It will be understood that the configurations and/or techniques described herein are exemplary in nature, and that these specific examples are not to be considered in a limiting sense, because numerous variations are possible. The specific methods and operations described herein may represent one or more of any number of processing strategies. As such, various acts illustrated and/or described may be performed in the sequence illustrated and/or described, in other sequences, in parallel, or omitted. Likewise, the order of the above-described operations may be changed, depending on implementation. The subject matter of the present disclosure includes all novel and non-obvious combinations and sub-combinations of the various configurations and techniques, and other features, functions, acts, and/or properties disclosed herein, as well as any and all equivalents thereof.

The invention claimed is:

1. A method of applying a spray treatment onto a surface of an airframe of an aircraft, the method using a set of multiple modular hood units, each modular hood unit of the set including one or more enclosure walls that partially defines a combined enclosure having a shared interior volume, the method comprising:
    assembling the set of multiple modular hood units to define the combined enclosure by, for each modular hood unit of the set:
        interfacing one or more surfaces of an interior of a fuselage of the airframe with at least two airframe-interfacing edges of the modular hood unit to define a portion of a spray treatment region of the airframe, and
        interfacing at least one inter-unit-interfacing edge of the modular hood unit with at least another inter-unit-interfacing edge of a neighboring modular hood unit of the set to form at least a portion of the combined enclosure; and
    spraying a treatment fluid onto a surface of the airframe within the spray treatment region bounded by the combined enclosure.

2. The method of claim 1, wherein the treatment fluid is sprayed via one or more spray nozzles; and wherein the method further comprises:
    inserting the one or more spray nozzles through one or more access ports formed in each modular hood unit of the set.

3. The method of claim 1, wherein the set of multiple modular hood units includes:
    a first end modular hood unit that forms a first end portion of the combined enclosure, and
    a second end modular hood unit that forms a second end portion of the combined enclosure.

4. The method of claim 3, wherein the set of multiple modular hood units further includes:
    one or more intermediate modular hood units that form an intermediate portion of the combined enclosure between the first end modular hood unit and the second end modular hood unit; and
    wherein the method further comprises:
        for each of the one or more intermediate modular hood units, interfacing a second inter-unit-interfacing edge with an inter-unit-interfacing edge of another neighboring modular hood unit of the set.

5. The method of claim 1, further comprising:
    exhausting air from the shared interior volume of the combined enclosure via a duct port of at least one modular hood unit of the set.

6. The method of claim 5, further comprising:
    joining an exhaust duct for exhausting air from the combined enclosure with the duct port of at least one modular hood unit of the set.

7. The method of claim 6, wherein exhausting air from the shared interior volume includes:
    while spraying the treatment fluid, operating one or more fans to exhaust the air via the duct port and exhaust duct.

8. The method of claim 1, reducing an air pressure within the combined enclosure below an air pressure outside of the combined enclosure by exhausting air from the shared interior volume of the combined enclosure via a duct port of at least one modular hood unit of the set while spraying the treatment fluid.

9. The method of claim 1, spraying the treatment fluid is performed via a spray subsystem including one or more spray nozzles and a supply conduit that delivers the treatment fluid to the one or more spray nozzles from a source external the shared interior volume of the combined enclosure.

10. The method of claim 9, wherein a spray access port of each modular hood unit accommodates one of the one or more spray nozzles.

11. The method of claim 1, further comprising:
    prior to spraying the treatment fluid, for each modular hood unit of the set, sealing an interface between the airframe and one or more of the at least two airframe-interfacing edges of the modular hood unit.

12. The method of claim 1, further comprising:
    prior to spraying the treatment fluid, for each modular hood unit of the set, sealing an interface between the least one inter-unit-interfacing edge of the modular hood unit and the at least another inter-unit-interfacing edge of the neighboring modular hood unit.

13. The method of claim 1, wherein assembling the set of multiple modular hood units further comprises:
    for each modular hood unit of the set, securing the modular hood unit to the neighboring modular hood unit via one or more fasteners.

14. The method of claim 1, wherein assembling the set of multiple modular hood units further comprises:
    securing one or more modular hood units of the set to the airframe.

15. The method of claim 1, wherein the set of multiple modular hood units are assembled in a vertically stacked configuration.

16. The method of claim 1, wherein the set of multiple modular hood units are assembled in a suspended configuration from an overhanging surface of the airframe.

17. A method of applying a spray treatment onto a surface of an airframe of an aircraft, the method using a set of multiple modular hood units, each modular hood unit of the set including one or more enclosure walls that partially defines a combined enclosure having a shared interior volume, the method comprising:
    assembling the set of multiple modular hood units to define the combined enclosure by, for each modular hood unit of the set:
        interfacing the airframe with at least two airframe-interfacing edges of the modular hood unit to define a portion of a spray treatment region of the airframe, and
        interfacing at least one inter-unit-interfacing edge of the modular hood unit with at least another inter-unit-interfacing edge of a neighboring modular hood unit of the set to form at least a portion of the combined enclosure;
    inserting one or more spray nozzles through a deformable diaphragm covering each of one or more access ports formed in each modular hood unit of the set; and spraying a treatment fluid onto a surface of the airframe within the spray treatment region bounded by the combined enclosure via the one or more spray nozzles.

18. The method of claim 17, wherein the set of multiple modular hood units includes:
   a first end modular hood unit that forms a first end portion of the combined enclosure,
   a second end modular hood unit that forms a second end portion of the combined enclosure, and one or more intermediate modular hood units that form an intermediate portion of the combined enclosure between the first end modular hood unit and the second end modular hood unit; and
   wherein the method further comprises:
      for each of the one or more intermediate modular hood units, interfacing a second inter-unit-interfacing edge with an inter-unit-interfacing edge of another neighboring modular hood unit of the set.

19. A method of applying a spray treatment onto a surface of an airframe of an aircraft, the method using a set of multiple modular hood units, each modular hood unit of the set including one or more enclosure walls that partially defines a combined enclosure having a shared interior volume, the method comprising:
   assembling the set of multiple modular hood units to define the combined enclosure by, for each modular hood unit of the set:
      interfacing the airframe with at least two airframe-interfacing edges of the modular hood unit to define a portion of a spray treatment region of the airframe, and
      interfacing at least one inter-unit-interfacing edge of the modular hood unit with at least another inter-unit-interfacing edge of a neighboring modular hood unit of the set to form at least a portion of the combined enclosure; and
   spraying a treatment fluid onto a surface of the airframe within the spray treatment region bounded by the combined enclosure;
   wherein the set of multiple modular hood units are assembled in a vertically stacked configuration or in a suspended configuration from an overhanging surface of the airframe.

20. The method of claim 19, wherein the set of multiple modular hood units includes:
   a first end modular hood unit that forms a first end portion of the combined enclosure,
   a second end modular hood unit that form a second end portion of the combined enclosure, and one or more intermediate modular hood units that form an intermediate portion of the combined enclosure between the first end modular hood unit and the second end modular hood unit; and
   wherein the method further comprises:
      for each of the one or more intermediate modular hood units, interfacing a second inter-unit-interfacing edge with an inter-unit-interfacing edge of another neighboring modular hood unit of the set.

* * * * *